US012807764B2

(12) United States Patent
Magbitang et al.

(10) Patent No.: US 12,807,764 B2
(45) Date of Patent: Nov. 24, 2026

(54) REWORKABLE POLYSILOXANES FOR THERMAL INTERFACE MATERIALS

(71) Applicant: International Business Machines Corporation, Armonk, NY (US)

(72) Inventors: Teddie P. Magbitang, San Jose, CA (US); Sushumna Iruvanti, Wappingers Falls, NY (US); Rudy J. Wojtecki, San Jose, CA (US); Ishwar Singh, Sunnyvale, CA (US)

(73) Assignee: International Business Machines Corporation, Armonk, NY (US)

( * ) Notice: Subject to any disclaimer, the term of this patent is extended or adjusted under 35 U.S.C. 154(b) by 663 days.

(21) Appl. No.: 18/329,722

(22) Filed: Jun. 6, 2023

(65) Prior Publication Data

US 2024/0409692 A1 Dec. 12, 2024

(51) Int. Cl.
*C08G 77/16* (2006.01)
*C08K 3/013* (2018.01)

(52) U.S. Cl.
CPC .............. *C08G 77/16* (2013.01); *C08K 3/013* (2018.01)

(58) Field of Classification Search
CPC .......... C08L 83/04; C08L 83/06; C08L 83/08; C08K 3/013
USPC .......................................................... 524/588
See application file for complete search history.

(56) References Cited

U.S. PATENT DOCUMENTS

| | | | | |
|---|---|---|---|---|
| 4,990,555 | A * | 2/1991 | Trego | C08G 77/16 524/424 |
| 8,511,369 | B2 | 8/2013 | Boday | |
| 8,917,510 | B2 | 12/2014 | Boday | |
| 9,085,719 | B2 | 7/2015 | Boday | |
| 2005/0228097 | A1 * | 10/2005 | Zhong | H10W 40/251 524/439 |
| 2005/0256241 | A1 | 11/2005 | Sachdev et al. | |
| 2012/0182693 | A1 | 7/2012 | Boday et al. | |
| 2012/0261064 | A1 | 10/2012 | Boday | |
| 2014/0262192 | A1 | 9/2014 | Boday et al. | |
| 2018/0237668 | A1 * | 8/2018 | Mizori | C08G 59/686 |
| 2023/0091115 | A1 | 3/2023 | Du et al. | |

FOREIGN PATENT DOCUMENTS

| | | | |
|---|---|---|---|
| CN | 112210194 | A | 1/2021 |
| CN | 112142991 | A | 3/2022 |
| CN | 112521754 | A | 5/2022 |
| CN | 113234422 | A | 7/2022 |
| CN | 115232379 | A | 10/2022 |

OTHER PUBLICATIONS

IBM, "Appendix P—List of IBM Patents or Patent Applications Treated as Related", dated Jun. 6, 2023, 2 pages.

Magbitang et al., "Reworkable Polysiloxanes for Thermal Interface Materials", U.S. Appl. No. 18/329,704, filed on Jun. 6, 2023, 49 pages.

Kobayashi et al., "Effect of Thermal Base Generators on the FRP Fabrication with Glycol-Lignin", Journal of Photopolymer Science and Technology vol. 31, No. 1 (2018), pp. 101-106.

Magbitang et al., "Reworkable & rehealable packaging materials from the introduction of orthogonal dynamic covalent chemistries", 2022 21st IEEE Intersociety Conference on Thermal and Thermomechanical Phenomena in Electronic Systems (iTherm), 6 pages, doi: 10.1109/iTherm54085.2022.9899557.

Schmolke et al., "Dynamically Cross-Linked Polydimethylsiloxane Networks with Ambient-Temperature Self-Healing", Macromolecules 2015, 48, Published: Dec. 11, 2015, pp. 8781-8788, http://dx.doi.org/10.1021/acs.macromol.5b01666.

Sikka et al., "Surface Silicon Bridge Direct Bonded Heterogeneous Integration (s-DBHi)", 2022 IEEE Electron Devices Technology & and Manufacturing Conference Proceedings of Technical Papers, pp. 145-147, DOI: 10.1109/EDTM53872.2022.9798272.

International Searching Authority, "Notification of Transmittal of the International Search Report and the Written Opinion of the International Searching Authority, or Declaration," Patent Cooperation Treaty, Aug. 26, 2024, 12 pages, International Application No. PCT/IB2024/054621.

International Searching Authority, "Notification of Transmittal of the International Search Report and the Written Opinion of the International Searching Authority, or Declaration," Patent Cooperation Treaty, Aug. 26, 2024, 9 pages, International Application No. PCT/IB2024/054624.

* cited by examiner

*Primary Examiner* — Hannah J Pak
(74) *Attorney, Agent, or Firm* — Harrity & Harrity, LLP

(57) ABSTRACT

A thermal interface material (TIM) that includes a hydroxy-terminated polysiloxane blended with a catalyst generator is disclosed. When the catalyst generator is activated by a thermal stimulus, it catalyzes cleavage of silicon-oxygen bonds in the hydroxy-terminated polysiloxane. A semiconductor package and a computing device containing the TIM are also disclosed. Additionally, a method of providing a TIM, as well as a semiconductor package containing the TIM are disclosed. Providing the TIM includes blending a hydroxy-terminated polysiloxane with a catalyst generator that cleaves silicon-oxygen bonds when activated by a thermal stimulus.

22 Claims, 14 Drawing Sheets

510

520

530

540

550

560

570

580

700

703

706

709

800

709

803

900

REWORKABLE POLYSILOXANES FOR THERMAL INTERFACE MATERIALS

BACKGROUND

The present disclosure relates to thermal interface materials (TIMs) and, more specifically, to polymer composite TIMs.

TIMs are widely used in electronic packaging to enhance heat conduction across the interfaces between a heat source (e.g., a chip) and a heat sink (e.g., a fin or cold plate). Roughness of the interfacing surfaces creates non-contacting areas that, if occupied by air, result in high thermal contact resistance ($R_c$) between the surfaces. Therefore, filling in the gaps with TIMs having much higher thermal conductivity (k) than air can significantly reduce the thermal contact resistance at these interfaces. Examples of TIMs can include metals (e.g., liquids, solders, or foils), polymer composites, carbon-based materials, and phase change materials (PCMs). Polymer composite TIMs include a polymer matrix (host) filled with a thermally conductive material (filler). The flexible matrix polymers may enable greater thermal conductivity than the filler material alone by improving contact between the interfacing surfaces.

However, TIMs still face challenges to meet the increasing requirements for semiconductor devices in terms of high k, low $R_c$, and high conformability. For example, the thermal conductivity of polydimethylsiloxane (PDMS)-based TIMs can be limited by defects and structural disorder in the polymer, which can act as scattering sites for heat carriers. These defects may be caused by undesirable crosslinking, insufficient adhesion, crack formation in the cured TIM, etc. Therefore, materials and techniques for preventing or repairing defects in polymer and polymer composite TIMs may lead to improved semiconductor package performance and reliability.

SUMMARY

Various embodiments are directed to a thermal interface material (TIM) that includes a hydroxy-terminated polysiloxane blended with a catalyst generator. When the catalyst generator is activated by a thermal stimulus, it catalyzes cleavage of silicon-oxygen bonds in the hydroxy-terminated polysiloxane. For example, the thermal stimulus may range from 160-200° C. The blend may contain about 1% of the catalyst generator by weight. The catalyst generator may be a salt that forms 1,8-diazabicyclo[5.4.0]undec-7-ene (DBU) in response to the thermal stimulus. For example, the catalyst may be triazabicyclodecene, pyridine, or tetra-n-butylammonium fluoride. In some embodiments, the hydroxy-terminated polysiloxane is a hydroxy-terminated polydimethylsiloxane. The TIM may also include a thermally conductive filler. In some embodiments, the TIM can be reworked to repair voids, cracks, and other defects by applying a thermal stimulus. Therefore, the TIM may improve yield and lifetime of packages and facilitate scaling of multichip modules.

Additional embodiments are directed to a method of providing a TIM, which includes blending a hydroxy-terminated polysiloxane with a catalyst generator that cleaves silicon-oxygen bonds when activated by a thermal stimulus. Various embodiments are also directed to a method of providing a semiconductor package that includes the TIM. Further embodiments are directed to a semiconductor package containing the TIM and a computing device including the semiconductor package. The reworkability of the TIM may advantageously allow healing of defects in the TIM. Further, using the TIM may facilitate scaling of multichip modules. The TIM may provide improvements to yield and lifetime of the semiconductor package and computing device.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1A:
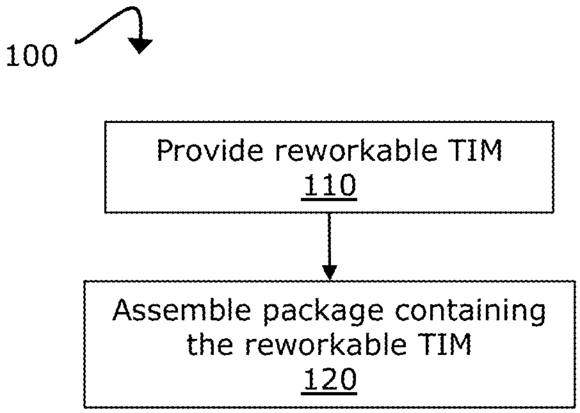
FIG. 1A is a flowchart illustrating a process of preparing an electronic device with a reworkable thermal interface material (TIM), according to some embodiments.

While the invention is amenable to various modifications and alternative forms, specifics thereof have been shown by way of example in the drawings, and will be described in detail. It should be understood, however, that the intention is not to limit the invention to the particular embodiments described. Instead, the intention is to cover all modifications, equivalents, and alternatives falling within the spirit and scope of the invention.

DETAILED DESCRIPTION

Embodiments of the present invention are generally directed to thermal interface materials (TIMs) and, more specifically, to polymer composite TIMs. While the present disclosure is not necessarily limited to such applications, various aspects of the disclosure may be appreciated through a discussion of examples using this context.

Various embodiments of the present disclosure are described herein with reference to the related drawings, where like numbers refer to the same component. Alternative embodiments can be devised without departing from the scope of the present disclosure. It is noted that various connections and positional relationships (e.g., over, below, adjacent, etc.) are set forth between elements in the following description and in the drawings. These connections and/or positional relationships, unless specified otherwise, can be direct or indirect, and the present disclosure is not intended to be limiting in this respect. Accordingly, a coupling of entities can refer to either a direct or an indirect coupling, and a positional relationship between entities can be a direct or indirect positional relationship. As an example of an indirect positional relationship, references in the present description to forming layer "A" over layer "B" include situations in which one or more intermediate layers (e.g., layer "C") is between layer "A" and layer "B" as long as the relevant characteristics and functionalities of layer "A" and layer "B" are not substantially changed by the intermediate layer(s).

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

For purposes of the description hereinafter, the terms "upper," "lower," "right," "left," "vertical," "horizontal," "top," "bottom," and derivatives thereof shall relate to the described structures and methods, as oriented in the drawing figures. The terms "overlying," "atop," "on top," "over," "positioned on," or "positioned atop" mean that a first element, such as a first structure, is present on a second element, such as a second structure, wherein intervening elements such as an interface structure can be present between the first element and the second element. The term "direct contact" means that a first element, such as a first structure, and a second element, such as a second structure, are connected without any intermediary conducting, insulating or semiconductor layers at the interface of the two elements. It should be noted, the term "selective to," such as, for example, "a first element selective to a second element," means that a first element can be etched, and the second element can act as an etch stop.

As used herein, the articles "a" and "an" preceding an element or component are intended to be nonrestrictive regarding the number of instances (i.e., occurrences) of the element or component. Therefore, "a" or "an" should be read to include one or at least one, and the singular word form of the element or component also includes the plural unless the number is obviously meant to be singular.

As used herein, the terms "invention" or "present invention" are non-limiting terms and not intended to refer to any single aspect of the particular invention but encompass all possible aspects as described in the specification and the claims.

Unless otherwise noted, ranges (e.g., time, concentration, temperature, etc.) indicated herein include both endpoints and all numbers between the endpoints. Unless specified otherwise, the use of a tilde (~) or terms such as "about," "substantially," "approximately," "slightly less than," and variations thereof are intended to include the degree of error associated with measurement of the particular quantity based upon the equipment available at the time of filing the application. For example, "about" can include a range of ±8%, 5%, 2%, or ≤1% of a given value, range of values, or endpoints of one or more ranges of values. Unless otherwise indicated, the use of terms such as these in connection with a range applies to both ends of the range (e.g., "approximately 1 g-5 g" should be interpreted as "approximately 1 g to approximately 5 g") and, in connection with a list of ranges, applies to each range in the list (e.g., "about 1 g-5 g, 5 g-10 g, etc." should be interpreted as "about 1 g to about 5 g, about 5 g to about 10 g, etc."). As used herein, n, m, l, and p represent integers greater than or equal to 1. Examples ranges of these integers are provided herein for polymer/crosslinker repeat units, methylene groups, etc., but the ranges may encompass any number of units appropriate for the composition. For example, n dimethylsiloxane units can represent any appropriate molecular weight (MW) polydimethylsiloxane (e.g., for TIM applications).

As used herein the term "aliphatic" encompasses the terms alkyl, alkenyl, or alkynyl. Aliphatic radicals or groups may have any degree of saturation, such as groups having only single carbon-carbon bonds ("alkyl" or "alkylene"), groups having one or more double carbon-carbon bonds ("alkenyl"), radicals having one or more triple carbon-carbon bonds ("alkynyl"), and groups having a mixture of single, double and/or triple carbon-carbon bonds.

As used herein, an "alkyl" group refers to a saturated aliphatic hydrocarbon group containing at least one carbon atom (e.g., C1-C4, C1-C6, or C1-C8 alkyls). An alkyl group can be straight, branched, cyclic, or any combination thereof. Unless specifically limited otherwise, the term "alkyl," as well as derivative terms such as "alkoxy" and "thioalkyl," as used herein, include within their scope, straight chain, branched chain, and cyclic moieties. If the alkyl radical is further bonded to another atom, it becomes an alkylene radical or alkylene group. In other words, the term "alkylene" also refers to a divalent linear or branched alkyl. For example, $—CH_2CH_3$ is an ethyl, while $—CH_2CH_2—$ is an ethylene. The term "alkylene" alone or as part of another substituent refers to a saturated linear or branched divalent hydrocarbon radical obtained by removing two hydrogen atoms from a single carbon atom or two different carbon atoms of a starting alkane.

Examples of alkyl radicals/moieties or alkyl groups include methyl, ethyl, propyl, 1-methylethyl, butyl, 1-methylpropyl, 2-methylpropyl, 1,1-dimethylethyl, pentyl, 1-methylbutyl, 2-methylbutyl, 3-methylbutyl, 2,2-dimethylpropyl, 1-ethylpropyl, hexyl, 1,1-dimethylpropyl, 1,2-dimethylpropyl, 1-methylpentyl, 2-methylpentyl, 3-methylpentyl, 4-methylpentyl, 1,1-dimethylbutyl, 1,2-dimethylbutyl, 1,3-dimethylbutyl, 2,2-dimethylbutyl, 2,3-dimethylbutyl, 3,3-dimethylbutyl, 1-ethylbutyl, 2-ethylbutyl, 1,1,2-trimethylpropyl, 1,2,2-trimethylpropyl, 1-ethyl-1-methylpropyl, and 1-ethyl-2-methylpropyl. The alkyl group or alkylene group as defined above may be unsubstituted or substituted with one or more substituents as set forth below.

As used herein, the term "cyclic" refers to a ring compound or group comprising at least three carbon atoms and the bonds between pairs of adjacent atoms may all be of the type designated single bonds (involving two electrons), or some of them may be double or triple bonds (with four or six electrons, respectively). Examples of cyclic aliphatic groups can include phenyl, saturated cycloalkyls (e.g., cyclopropyl, cyclobutyl, cyclopentyl, or cyclohexyl), etc.

As used herein, the term "amine" or "amino" includes compounds where a nitrogen atom is covalently bonded to at least one carbon or heteroatom. The term "amine" or "amino" includes —$NH_2$ and also includes substituted moieties. The term includes "alkyl amino" which comprises groups and compounds wherein the nitrogen is bound to at least one additional alkyl group (e.g., a secondary or tertiary amine). As used herein, the term "imino" group or residue means the bivalent group ═NR, wherein R represents either H or an alkyl group as defined herein. As used herein, the term "imide" refers to groups or compounds having a nitrogen atom covalently bonded to two carbonyl groups. As used herein, the term "furan" refers to groups or compounds having a five-membered aromatic ring containing four carbon atoms and one oxygen atom.

As described herein, compounds of the present disclosure can optionally be substituted with one or more substituents, such as are illustrated generally above, or as exemplified by particular classes, subclasses, and species of the present disclosure. As described herein, any of the above moieties or those introduced below can be optionally substituted with one or more substituents described herein.

The term "substituted" in the context of the present disclosure means that one or more hydrogen atoms of the indicated radical or group is/are independently replaced by the same or a different substituent(s). Additionally, the term "substituted" specifically provides for one or more, e.g., two, three, or more, substituents commonly used in the art. However, it is generally known that the substituents should be selected so that they do not adversely affect the useful properties of the compound or its function.

Suitable substituents in the context of the present disclosure may include, in some embodiments, halogen groups, perfluoroalkyl groups, perfluoroalkoxy groups, alkyl groups, alkenyl groups, alkynyl groups, hydroxy groups, oxo groups, mercapto groups, alkylthio groups, alkoxy groups, aryl or heteroaryl groups, aryloxy groups or heteroaryloxy groups, arylalkyl or heteroarylalkyl groups, arylalkoxy or heteroarylalkoxy groups, amino groups, alkyl and dialkylamino groups, carbamoyl groups, alkylcarbonyl groups, carboxyl groups, alkoxycarbonyl groups, alkylaminocarbonyl groups, dialkylaminocarbonyl groups, arylcarbonyl groups, aryloxycarbonyl groups, alkylsulfonyl groups, arylsulfonyl groups, cycloalkyl groups, cyano groups, C1 to C6 alkylthio groups, arylthio groups, nitro groups, keto groups, acyl groups, boronate or boronyl groups, phosphate or phosphonyl groups, sulfamyl groups, sulfonyl groups, sulfinyl groups, and combinations thereof.

In further embodiments, substituents or substituent groups may include halogen, hydroxyl, alkyl, alkenyl, alkynyl, alkoxyl, —$NH_2$, amino (primary, secondary, or tertiary), nitro, thiol, thioether, imine, cyano, amido, phosphonato, phosphine, carboxyl, thiocarbonyl, sulfonyl, sulfonamide, ketone, aldehyde, ester, acetyl, acetoxy, carbamoyl, oxygen (O); haloalkyl (e.g., trifluoromethyl); aminoacyl and aminoalkyl, carbocyclic cycloalkyl, which may be monocyclic or fused or non-fused polycyclic (e.g., cyclopropyl, cyclobutyl, cyclopentyl, or cyclohexyl), or a heterocycloalkyl, which may be monocyclic or fused or non-fused polycyclic (e.g., pyrrolidinyl, piperidinyl, piperazinyl, morpholinyl, or thiazinyl), carbocyclic or heterocyclic, monocyclic or fused or non-fused polycyclic aryl (e.g., phenyl, naphthyl, pyrrolyl, indolyl, furanyl, thiophenyl, imidazolyl, oxazolyl, isoxazolyl, thiazolyl, triazolyl, tetrazolyl, pyrazolyl, pyridinyl, quinolinyl, isoquinolinyl, acridinyl, pyrazinyl, pyridazinyl, pyrimidinyl, benzimidazolyl, benzothiophenyl, or benzofuranyl), —$CO_2CH_3$, —$CONH_2$, —$OCH_2CONH_2$; —$SO_2NH_2$, —$OCHF_2$, —$CF_3$, —$OCF_3$.

Modifications or derivatives of the compounds disclosed throughout this specification are contemplated as being useful with the methods and compositions of the present disclosure. Derivatives may be prepared and the properties of such derivatives may be assayed for their desired properties by any method known to those of skill in the art. In certain aspects, "derivative" refers to a chemically modified compound that still retains the desired effects of the compound prior to the chemical modification.

In various embodiments, conventional materials and processing techniques can be employed and, hence, such conventional aspects are not set forth herein in detail. For example, the selection of suitable polysiloxanes, curing conditions, solvents, photosensitizers, pigments, fillers, antistatic agents, flame retardants, defoaming agents, light stabilizers, and antioxidants can be conducted in a conventional manner.

For the sake of brevity, conventional techniques related to semiconductor device and integrated circuit (IC) fabrication may or may not be described in detail herein. Moreover, the various tasks and process steps described herein can be incorporated into a more comprehensive procedure or process having additional steps or functionality not described in detail herein. In particular, various steps in the manufacture of semiconductor devices and semiconductor-based ICs are well known and so, in the interest of brevity, many conventional steps will only be mentioned briefly herein or will be omitted entirely without providing the well-known process details.

It should also be understood that material compounds will be described in terms of listed elements, e.g., SiN, or SiGe. These compounds include different proportions of the elements within the compound, e.g., SiGe includes $Si_xGe_{(1-x)}$ where x is less than or equal to 1, and the like. In addition, other elements can be included in the compound and still function in accordance with the present principles. The compounds with additional elements will be referred to herein as alloys.

Turning now to an overview of technologies that are more specifically relevant to aspects of the present disclosure, in general, electronic packaging components of semiconductor and microelectronic devices can include a variety of polymeric materials, such as underfills, thermal interface materials (TIMs), adhesives, pastes, laminates, etc.

TIMs are widely used in electronic packing to enhance heat conduction across the interfaces between heat source and heat sink. Roughness of the interfacing surfaces creates non-contacting areas that, if occupied by air, result in high thermal contact resistance ($R_c$) between the surfaces. Therefore, filling in the gaps with TIMs having much higher thermal conductivity (k) than air can significantly reduce the thermal contact resistance at interfaces between electronic packaging components. Examples of TIMs can include various metals (e.g., liquids, solders, or foils), filled polymer matrices (polymer composites, greases, gels, etc.), carbon-based materials, and phase change materials (PCMs). Polymer composite TIMs can include a polymer matrix (e.g., PDMS or other polysiloxanes) filled with a thermally conductive material ("filler"), such as graphite, aluminum, aluminum nitride (AlN), aluminum oxide (alumina), alumina-aluminum, aluminosilicates, boron nitride (BN), liquid gallium or its alloys, etc. TIMs can be selected based on properties such as high k, low thermal contact resistance ($R_c$), and high conformability.

However, TIMs still face challenges to meet the increasing requirements for high frequency and high integration of electronics, such as high k, low $R_c$, and high conformability. Single-chip module TIM degradation can cause performance loss and increased thermal resistance. Additionally, as packages move to multi-chip modules, the likelihood of degradation of the TIM may be higher due greater warpage often found in multi-chip modules.

Current TIMs can undergo crack formation or material failures leading to thermal degradation/voids impacting device performance or causing rejection of package components. Matrix polymers for existing TIMs are typically based on non-reversible PDMS crosslinking chemistry. Therefore, once the TIM is cured, reworking the material may not be possible. Instead, a damaged or ineffective TIM layer may need to be replaced entirely. Existing methods that attempt to address this can introduce complexity and additional cost to the assembly process and bonding of the TIM. For example, existing techniques for improving TIM adhesion can include using stiffeners or tie-downs, which place strain on the TIM, but these techniques take up space on the laminate surface. Therefore, components such as these can interfere with ground rules for device layout.

Liquid metal materials (e.g., gallium-based liquid metals) have shown the ability to provide highly thermally conductive films as the filler component in a polymer composite TIM. The dispersion of liquid droplets in a pre-crosslinked polymer matrix film can enable the formation of percolating networks kinetically trapped by crosslinking of the polymer network. However, if the polymer network crosslinks in a way that creates too much distance between regions or droplets of the thermally conductive filler, thermal contact resistance of the TIM can increase. When this type of crosslinking is non-reversible, as in existing polymer composite TIMs, improving distribution and conductivity of the filler may not be possible after curing.

Embodiments of the present disclosure may overcome these and other challenges by providing TIMs that, when heated, may be reworked to repair voids, cracks, and other defects in the TIMs. In some embodiments, the disclosed TIMs may be used without requiring significant modifications to typical packaging processes or components. For example, TIMs may be included in capped packages (e.g., as TIM1/TIM2) or direct-attach cases (e.g., as TIM1.5). Additionally, the reworkable TIMs may improve yield and lifetime of packages and facilitate scaling of multichip modules.

The reworkable TIMs can include polymer networks with relaxation pathways (e.g., reversible crosslinking chemistry, dynamic covalent bonds, supramolecular interactions, etc.) that can be used to reversibly "soften" the polymers above threshold temperatures. The reworkable TIMs can be composite films of these polymer networks (matrices) and thermally conductive fillers, such as metal particles or liquid metals.

In some embodiments, relaxation pathways for TIM polysiloxane chains may be generated by the introduction of persistent anionic chain ends. For example, the reworkable TIMs can include hydroxy-terminated polysiloxanes blended with latent organic catalysts that, when activated by a thermal stimulus, can cleave silicon-oxygen bonds in the polymer chains.

In further embodiments, relaxation pathways may be generated by incorporating thermally reversible cycloadducts into a network of polysiloxane chains. For example, hydride crosslinking polysiloxane components (e.g., backbone, branches, crosslinkers, etc.) may be replaced with polysiloxane components functionalized with diene/dienophile groups, such as cyclopentadiene single component systems or furan/maleimide derivatives. In another example, the polysiloxane includes siloxane surface functionalities that may reversibly dimerize in response to a heat stimulus in order to improve surface adhesion. In an additional example, a crosslinked network formed by Diels-Alder reactions between bismaleimide and trifunctional furan crosslinkers may be blended with a polysiloxane.

Referring now to the drawings, in which like numerals represent the same or similar elements, FIG. 1A is a flowchart illustrating a process 100 of preparing an electronic device with a reworkable thermal interface material (TIM), according to some embodiments. A reworkable TIM can be provided. This is illustrated at operation 110. As discussed above, the reworkable TIM can be a polymer composite TIM. A polymer matrix of the reworkable TIM can include a polysiloxane, such as a polydimethylsiloxane (PDMS) or another polysiloxane (e.g., poly(dimethyl siloxane-co-diphenyl siloxane)).

In some embodiments, the polysiloxane may be functionalized with thermally reversible cycloadducts. Herein, "cycloadduct" and "dimer" are used interchangeably to refer to products of Diels-Alder cycloaddition/dimerization reactions. For example, polysiloxane chains having Diels-Alder terminal groups may be cured to form a polysiloxane backbone linked by the thermally reversible cycloadducts. In another example, the polysiloxane chains may be crosslinked and/or branched by sidechain and/or terminal Diels-Alder groups. The polymer network may include thermally reversible cycloadducts in both the backbone and crosslinks/branches in some embodiments.

In further embodiments, the polymer matrix may be formed by blending a polysiloxane with an immiscible crosslinked network containing the thermally reversible cycloadducts or by surface-functionalizing a polysiloxane with thermally reversible cycloadducts. In these embodiments, the polysiloxane may be a conventional polysiloxane (e.g., unsubstituted PDMS) or a reversibly dimerized polysiloxane network as described above. The surface functionalization of the polysiloxane may include reversibly-dimerized siloxane small molecules. The surface functionalities may promote adhesion to surfaces of device components. The immiscible crosslinked network may provide covalent (e.g., cycloadducts) and physical crosslinks (e.g., crystalline domains, aggregates, etc.), both of which may be reversed in response to a thermal stimulus.

In additional embodiments, the reworkable TIMs may include polysiloxanes blended with latent organic catalysts that, when activated by a thermal stimulus, can cleave silicon-oxygen bonds in the polymer chains. This is discussed in greater detail with respect to FIGS. 10A and 10B.

By varying the polysiloxane chain lengths, crosslinking/branching, filler, number/type of reversible cycloadduct units, concentration of catalyst generator, etc., reworkable TIMs with different viscosities, curing temperatures, thermal conductivities, and other properties may be provided. The reworkable TIM can also include a thermally conductive filler material, such as graphite, aluminum, aluminum nitride (AlN), alumina, alumina-aluminum, boron nitride (BN), liquid metals (e.g., gallium-indium, gallium-indium-tin, etc.), within the polysiloxane matrix. In some embodiments, the TIM contains at least 90 wt. % thermally conductive filler, although the amount may be varied.

A semiconductor package can be assembled with the reworkable TIM. This is illustrated at operation 120. Assembly of the package can include applying and curing a layer of the TIM at an interface between a heat sink and a heat source (see, e.g., FIG. 2). Any appropriate technique for assembling semiconductor packages with polysiloxane-based TIMs may be used. Examples of these techniques are known in the art and, therefore, are not discussed in detail herein. In some embodiments, assembly of the package may include application of a thermal stimulus to the reworkable TIM after curing. However, the thermal stimulus may be applied after the device is assembled, as shown in FIG. 1B.

Figure 1B:
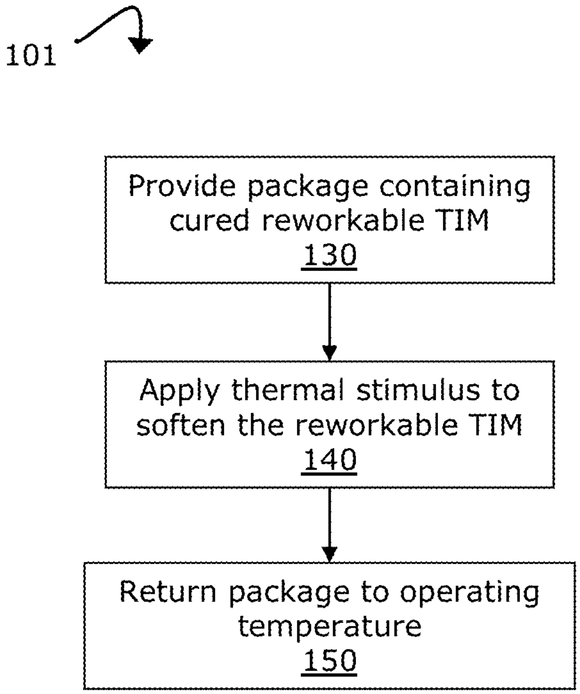
FIG. 1B is a flowchart illustrating a process of reworking a cured TIM layer, according to some embodiments.

FIG. 1B is a flowchart illustrating a process 101 of reworking a cured TIM layer, according to some embodiments. A device containing the cured TIM layer can be provided. This is illustrated at operation 130. In some embodiments, the device is a semiconductor package containing at least one reworkable TIM layer generated in process 100 (FIG. 1A). In further embodiments, the device is a computing device containing at least one semiconductor package with the reworkable TIM. In some embodiments, the device is provided when found to be underperforming after a period of use (e.g., due to TIM crack formation or adhesion loss). The device may also be provided in response to detecting at least one faulty chip during testing.

A thermal stimulus can be applied at the provided device to rework the TIM. This is illustrated at operation 140. As used herein, "thermal stimulus" can refer to heat applied at or above a threshold temperature or range of temperatures sufficient for reworking the TIM polymer (e.g., between about 60-150° C.), but below a temperature that would cause damage to the TIM or other device components. For example, there may be a minimum temperature for reworking the polymer network and a maximum temperature determined based on the thermal stability of the TIM and other device components. The heat stimulus may be applied for approximately 10-30 minutes, although the time may vary (e.g., about 5-10 min., 10-15 min., 15-20 min., 30-60 min., 1-12 hours, etc.).

The heat stimulus can then be removed and the TIM allowed to cool to below the threshold temperature (e.g., ambient temperature or any other temperature appropriate for operation of the device). This is illustrated at operation 150. This can cause the reworked TIM polymer to resolidify via Diels-Alder cycloaddition. The reworking may result in healing of cracks in the TIM and improved adhesion to the device surfaces. Additionally, the reworking may correct undesirable crosslinking of the polysiloxane.

Figure 2:
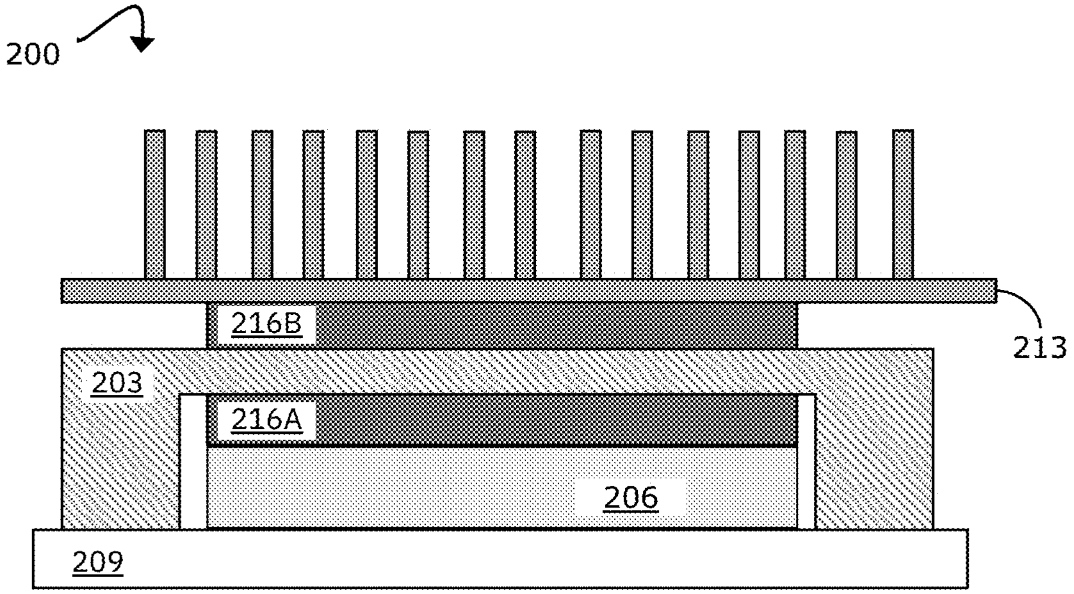
FIG. 2 is a block diagram illustrating a portion of an electronic device module containing a reworkable TIM, according to some embodiments.

FIG. 2 is a block diagram illustrating a portion of an electronic device module 200 containing a reworkable TIM, according to some embodiments. FIG. 2 provides a simplified illustration of a semiconductor package that can contain a reworkable TIM, as discussed above with respect to FIGS. 1A and 1B. Module 200 can include a package lid 203 (e.g., an integrated heat spreader (IHS)) over a semiconductor (silicon chip 206) mounted on a substrate 209. A heat sink 213 can be mounted on the lid 203.

The capped package of module 200 includes TIM1/TIM2 layers 216A and 216B (collectively "TIM layers 216"). TIM1 216A is at an interface between the chip 206 and the package lid 203, and TIM2 216B is at the interface between the lid 203 and the heat sink 213. In other embodiments, the number/configuration of TIM layers 216 may vary. For example, TIMs such as TIM layers 216 may be included in packaging based on direct bonded heterogeneous integration (DBHi), where processor chips are directly bonded to silicon bridges using copper pillars. While not illustrated in FIG. 2, other device/packaging components can be included in module 200, such as solder balls and underfill between the chip 206 and substrate 209, additional semiconductor packages mounted on the substrate 209, or any other appropriate components known in the art.

Figure 3A:
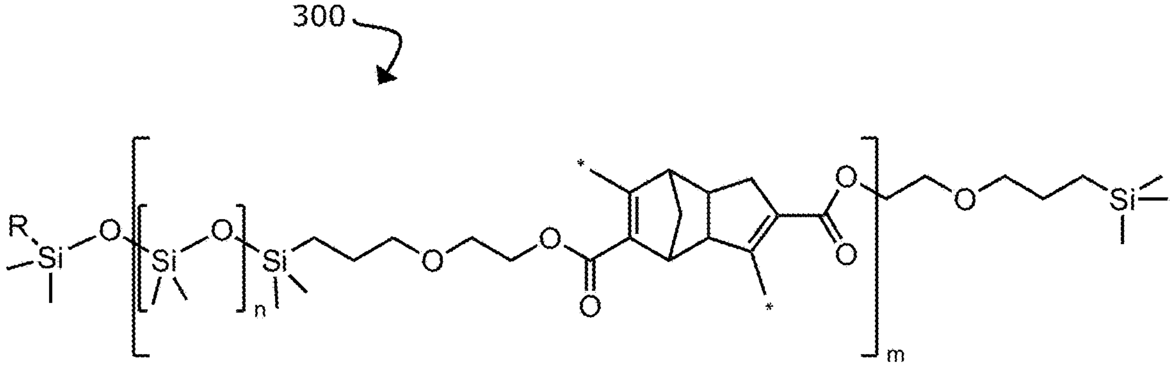
FIG. 3A is a chemical structure diagram illustrating an example of a polysiloxane with substituted cycloadduct units.

FIG. 3A is a chemical structure diagram illustrating an example of a polysiloxane (PDMS) 300 with substituted cycloadduct units, according to some embodiments of the present disclosure. Polysiloxane 300 may be used in a reworkable TIM (e.g., TIM layers 216). In the structure of polymer 300, n and m each represent an integer greater than or equal to 1, and the starred bonds represent substituents that may be varied in order to tune properties of the polymer. The substituents may be independently selected and, in some embodiments, are alkyl groups (e.g., methyl, ethyl, propyl, butyl, etc.). However, in other embodiments, at least one starred bond may be to a hydrogen atom (e.g., when the cyclopentadiene group is unsubstituted). In further embodiments, other substituents may be selected (e.g., from the example substituents discussed above) depending on the desired properties.

Polysiloxane 300 may be formed by dimerization of substituted pentadiene terminal groups on PDMS chains. The cyclopentadiene end groups dimerize in a Diels-Alder reaction, or a reversible cycloaddition reaction between a conjugated diene and a substituted alkene ("dienophile"). Changing the diene or dienophile can modulate the effect of temperature on the reaction's equilibrium. For example, dienophiles with stronger electron withdrawing groups may react at lower temperatures. Therefore, by addition of electron withdrawing or donating groups on the cyclopentadiene units (e.g., at the starred bonds), the temperature at which crosslinking/reworking can occur may be modulated in some embodiments. In further embodiments, steric effects of substituents on the cyclopentadiene species may be varied to modulate the threshold temperature for reverse dimerization.

Figure 3B:
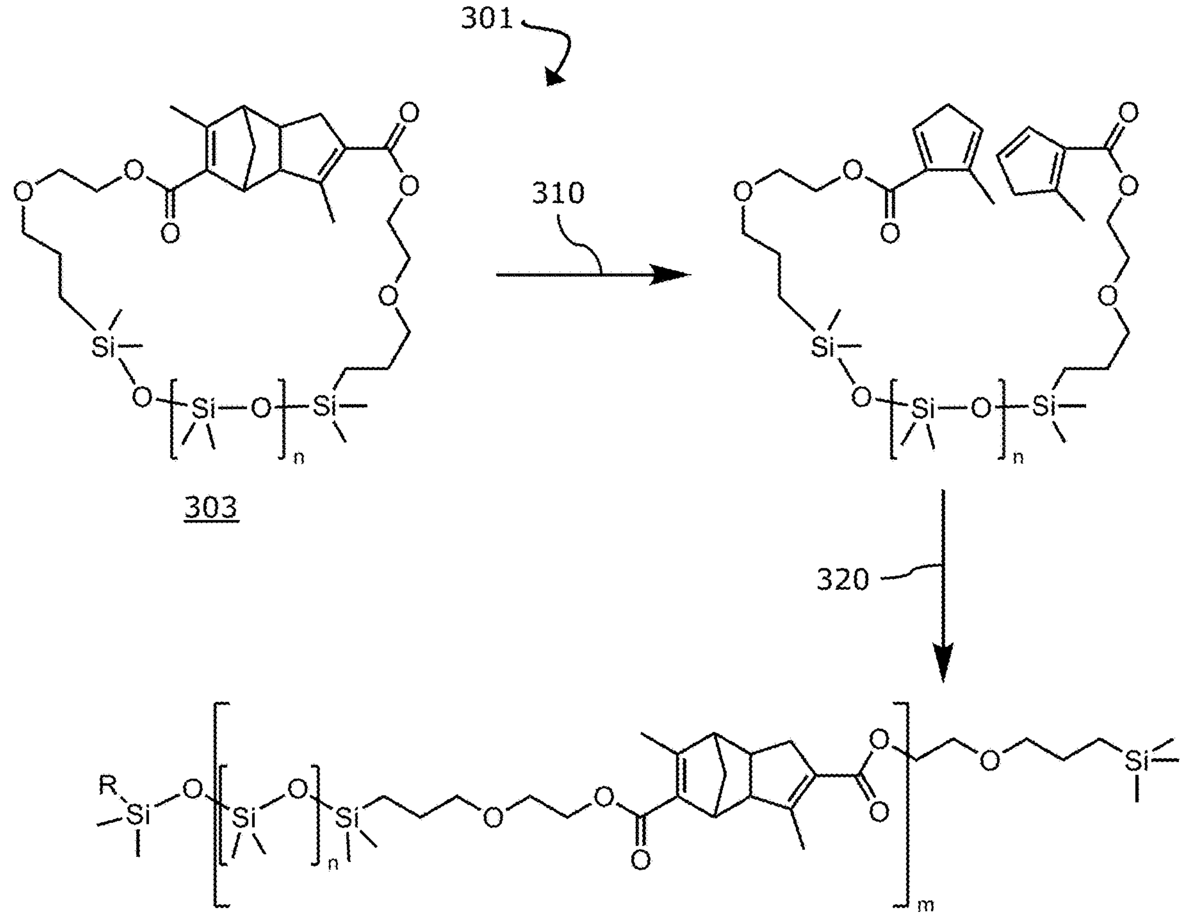
FIG. 3B is a chemical reaction diagram illustrating a process of reworking a polysiloxane such as the polysiloxane shown in FIG. 3A, according to some embodiments.

FIG. 3B is a chemical reaction diagram illustrating a process 301 of reworking a polysiloxane, according to some embodiments. A cured TIM that includes a polysiloxane such as that shown in FIG. 3A may include dimerized end groups on the same polysiloxane chain 303, as shown in FIG. 3B. Only one "self-dimerized" PDMS molecule 303 is shown in FIG. 3B, but there may be PDMS molecules of varying chain lengths and arrangements in the cured TIM polymer matrix. The presence of self-dimerized polysiloxane chains may reduce thermal conductivity by interrupting the linear formation of the polymer network. A heat stimulus can be applied in order to cause reverse dimerization of the cyclopentadiene dimer unit. This is illustrated at operation 310. Removing the heat stimulus can result in cycloadduct formation with cyclopentadiene end groups of other PDMS chains in the polymer network. This is illustrated at operation 320.

Figure 4:
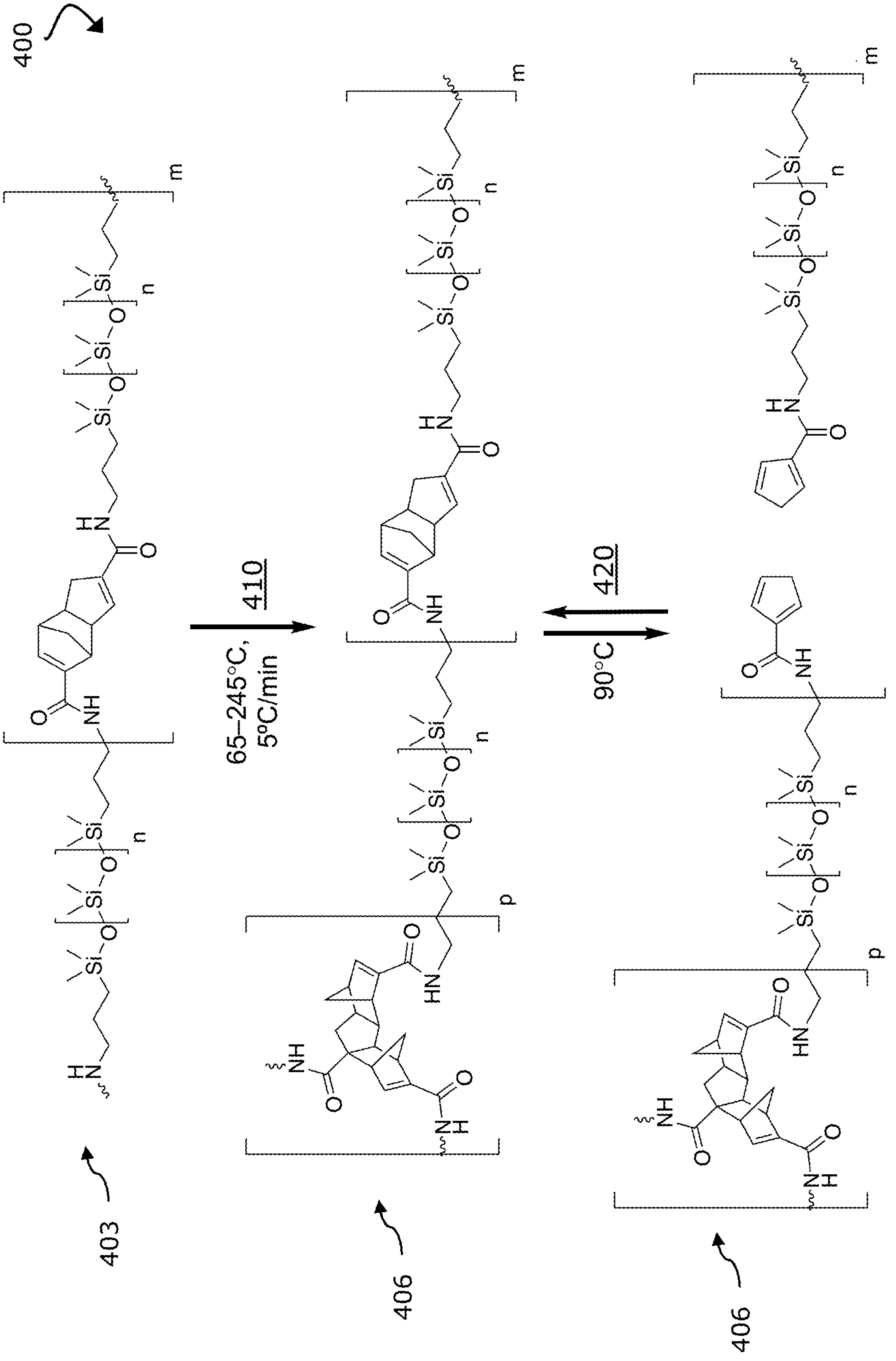
FIG. 4 is a chemical reaction diagram illustrating an experimental example of a thermal stability test with a polysiloxane, according to some embodiments.

FIG. 4 is a chemical reaction diagram illustrating an experimental example 400 of a thermal stability test with a reworkable polysiloxane 403, according to some embodiments. The polysiloxane (PDMS) 403 includes m chains of n siloxane units linked by DA adducts, where m and n are integers greater than 1. In the experimental example, m ranged from about 3-5, and the molecular weight of polysiloxane ranged from about 180-13,000 g/mol. At operation 410, the polymer 403 was cured in a nitrogen ($N_2$)-purged polyimide bake oven, under slight vacuum, over a temperature range of 65-245° C. The temperature was increased from 65° C. at a rate of 5° C./minute and then held at 245° C. for about 10 minutes. Curing over this temperature range resulted in p trimers (where p is an integer greater than 1) forming from cyclopentadiene terminal groups on at least two molecules of polysiloxane 403. A heat stimulus of about 90° C. was applied to the trimerized polymer 406 for ~30 minutes at operation 420. At this temperature, the DA dimerization was reversible, but the trimerization was not.

Figure 5A:
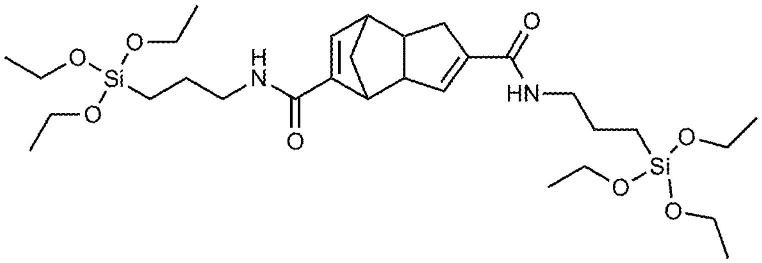
FIG. 5A is a chemical structure diagram illustrating siloxane cyclopentadiene dimers, according to some embodiments.
Figure 5A:
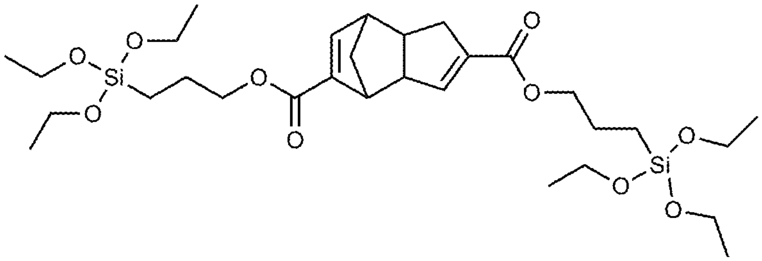
Figure 5A:
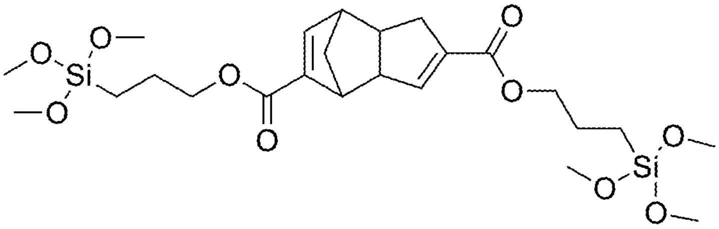
Figure 5A:
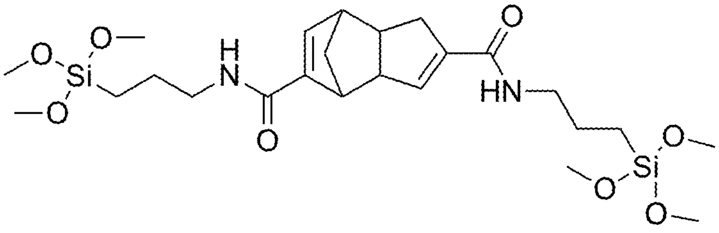

FIG. 5A is a chemical structure diagram illustrating siloxane Diels-Alder dimers, according to some embodiments. Species such as compounds 510-540 may be used as surface functionalities on a polysiloxane TIM. The dimers 510-540 illustrated in FIG. 5A include Diels-Alder adducts that may be "de-dimerized" in response to a thermal stimulus above a threshold temperature (e.g., about 90-120 C). Therefore, if there is adhesion loss at the TIM surface, application of a heat stimulus to the device may be used to improve adhesion at the surface upon reworking/cooling.

Figure 5B:
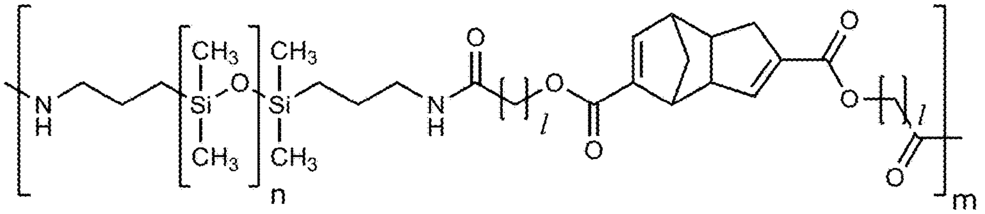
FIG. 5B is a chemical structure diagram illustrating example polysiloxanes with thermally reversible cyclopentadiene dimer units, according to some embodiments.
Figure 5B:
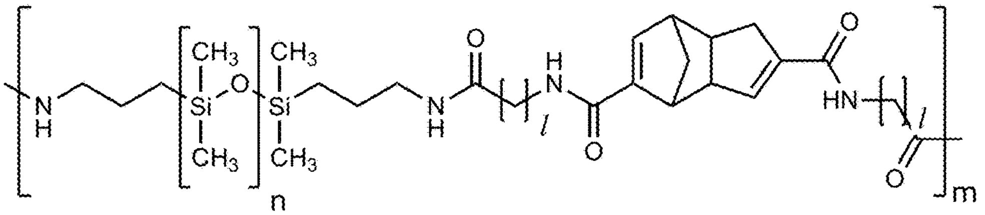
Figure 5B:
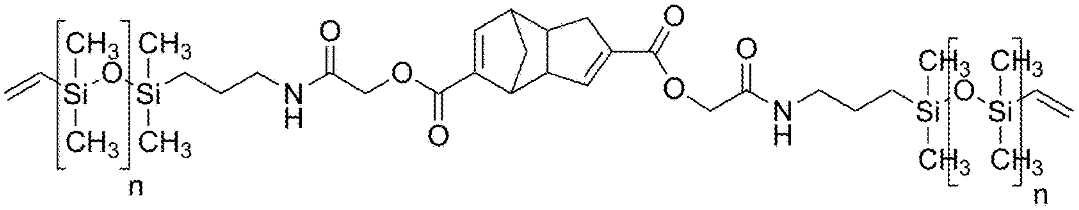
Figure 5B:
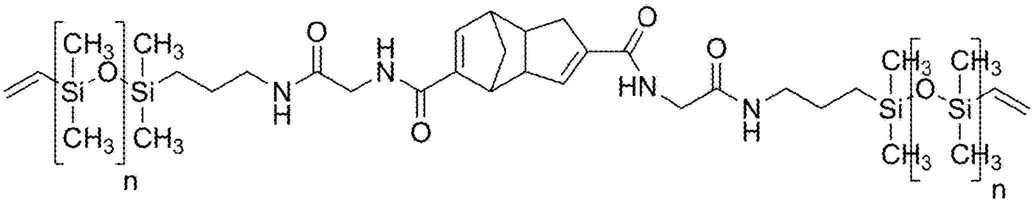

FIG. 5B is set of chemical structure diagrams illustrating example reworkable polysiloxanes 550-580 with thermally reversible cycloadduct units, according to some embodiments. These polysiloxanes 550-580 include a polysiloxane (PDMS) backbone in which the polysiloxane chains are linked by thermally reversible cycloadducts. The backbone may be formed by curing a polysiloxane with cyclopentadiene terminal groups or other Diels-Alder terminal groups (not shown in FIG. 5B) using any appropriate curing conditions for the polysiloxane. Polysiloxanes 550-580 and thermally conductive fillers may be used to form reworkable TIM layers as discussed in greater detail above with respect to FIGS. 1A-2. In the diagrams, n, l, and m are each integers greater than or equal to 1. For example, n may represent about 34 dimethylsiloxane repeat units, l may represent about 11 methylene ($—CH_2—$) groups, and m may represent about 1-100 PDMS chains linked by cycloadduct units. While dimethylsiloxane repeat units are illustrated, in some embodiments, at least a portion of the methyl groups may be replaced by another alkyl, such as phenyl. For example, poly(dimethylsiloxane-co-diphenylsiloxane) may be used as an alternative to PDMS.

Figure 6:
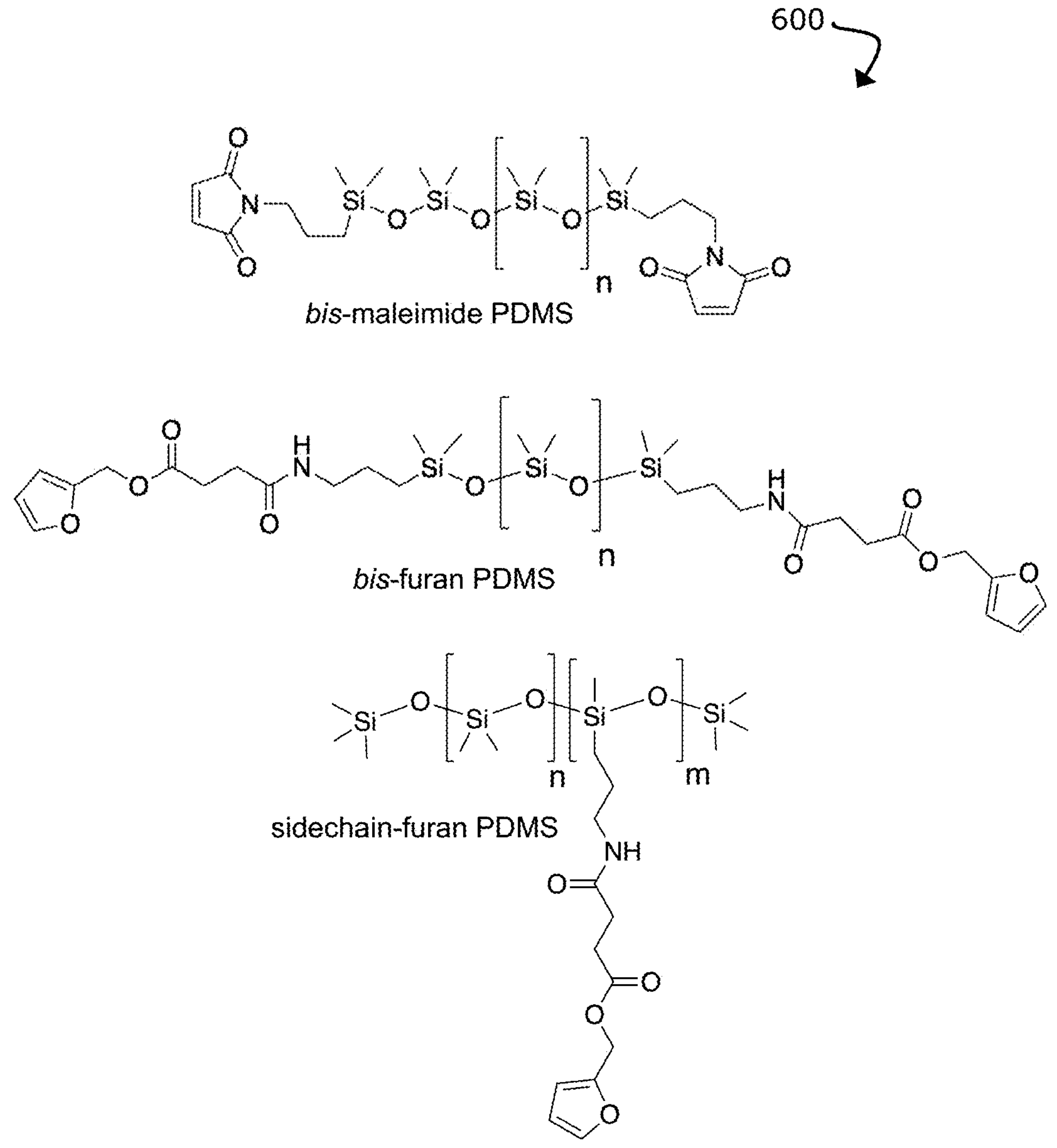
FIG. 6 is a chemical structure diagram illustrating polysiloxanes with furan and maleimide groups that can form thermally reversible dimer units, according to some embodiments.

FIG. 6 is a chemical structure diagram illustrating a group of polysiloxanes 600 with furan and maleimide groups, according to some embodiments. The illustrated compounds include a bis-maleimide PDMS (n=~7-30), a bis-furan PDMS (n=~7-30), and a side-chain furan PDMS (n=~150), which can react with one another to form furan/maleimide dimer units via Diels-Alder cycloaddition reactions. In some embodiments, a mixture of the PDMS compounds 600 can be cured in the presence of a radical inhibitor (e.g., N,N'-diphenylthiourea, butylated hydroxytoluene, catechol, 4-tert-butylcatechol, 2,2,6,6-tetramethylpiperidine-N-oxyl (TEMPO), 1,4-napthoquinone, etc.) in order to prevent non-reversible crosslinking by radical mechanisms. For example, a mixture of the PDMS compounds 600 and the radical inhibitor may be cured at about 75° C. (e.g., for ~20 hours). The bis-maleimide-PDMS:bis-furan-PDMS:side-chain-furan-PDMS ratio in the mixture may be 1:1:1 or 1:0.5:0.5, although the ratio can be adjusted based on, e.g., desired thermal properties and viscosity of the resulting TIM.

This reaction can produce a polymer network (not shown in FIG. 6) that includes a backbone and/or branches of polysiloxane chains linked by thermally reversible furan/maleimide cycloadducts, as well as thermally reversible furan/maleimide cycloadduct crosslinks formed by dimerization of the sidechains. The cycloadducts in the cured TIM can be "de-dimerized" by reverse-Diels-Alder reactions in the presence of a heat stimulus (e.g., ~100-120° C. for about 10-30 minutes).

Figure 7A:
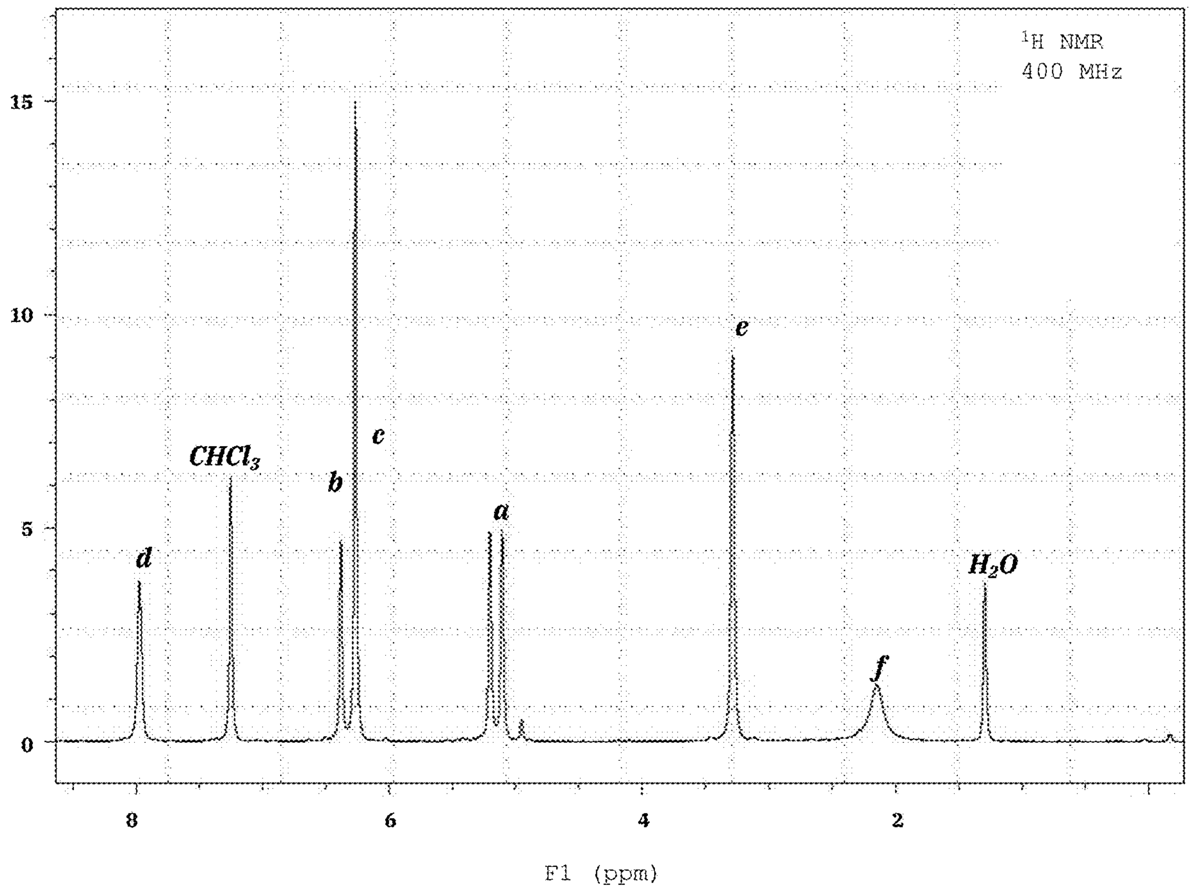
FIG. 7A illustrates a proton nuclear magnetic resonance ($^1$H NMR) spectrum and corresponding chemical structure diagram of a first trifunctional furan crosslinker.
Figure 7A:
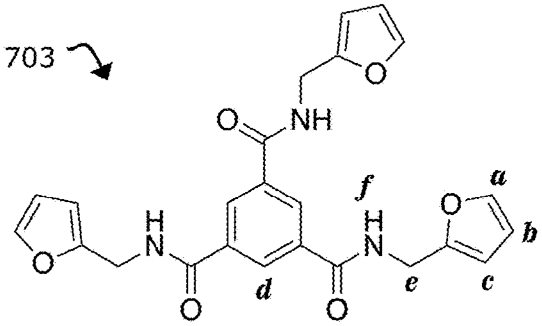

FIG. 7A illustrates a proton nuclear magnetic resonance ("$^1$H NMR" or "NMR") spectrum 700 and corresponding chemical structure diagram of a first trifunctional furan crosslinker 703 ("trifunctional crosslinker 703"). The NMR spectrum 700 was obtained experimentally from a solution of trifunctional crosslinker 703 in deuterated chloroform ($CDCl_3$). Positions of hydrogen atoms on trifunctional crosslinker 703 and their corresponding spectral peaks in the NMR spectrum 700 are labeled a-f in FIG. 7A.

The sample of trifunctional furan crosslinker 703 from which the NMR 700 was obtained was synthesized as follows:

A mixture of 5 g trimesic acid, 10 mL of thionyl chloride ($SOCl_2$), and a catalytic amount of dimethylfuran (DMF) was heated to reflux for about 3 hours. Remaining $SOCl_2$ was evaporated under reduced pressure to obtain the trimesoyl chloride (1,3,-benzenetricarboxylic acid chloride) product. The trimesoyl chloride and about ten equivalents (eq.) of furfuryl amine were then dissolved in DMF. Pyridine was added dropwise to this solution at about 0° C. and stirred for ~18 hours. The reaction mixture was then diluted with excess dichloromethane (DCM) and extracted with about 1 molar (1 M) hydrochloric acid (HCl). The extracted organic phase was dried with magnesium sulfate ($MgSO_4$) and purified via column chromatography (1:1 hexanes:ethyl acetate) to obtain trifunctional crosslinker 703.

Figure 7B:
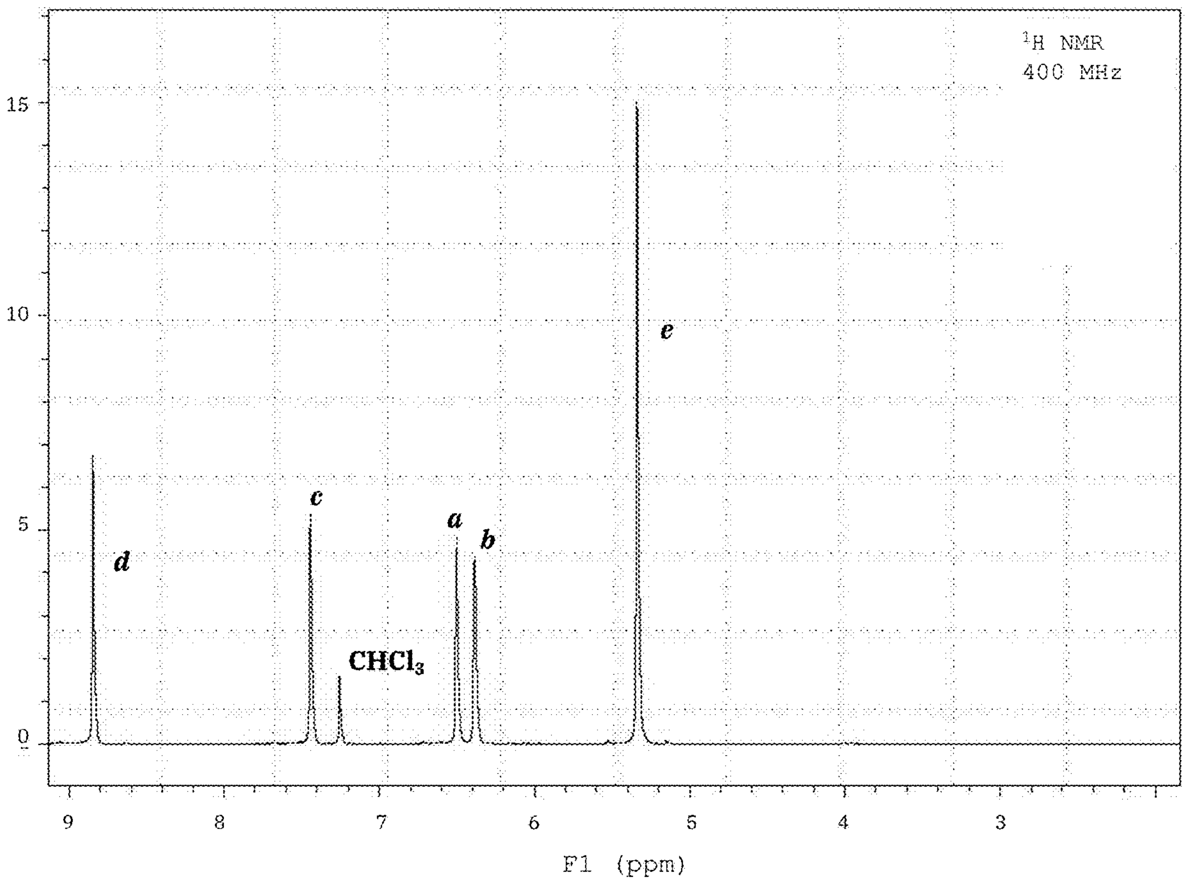
FIG. 7B illustrates a $^1$H NMR spectrum and corresponding chemical structure diagram of a second trifunctional furan crosslinker.
Figure 7B:
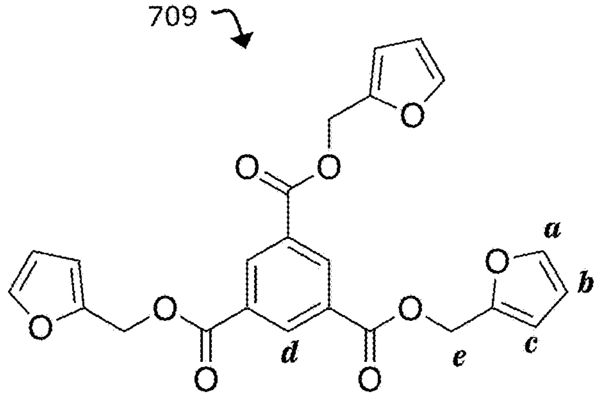

FIG. 7B illustrates a $^1$H NMR spectrum 706 and corresponding chemical structure diagram of a second trifunctional furan crosslinker 709 ("trifunctional crosslinker 709"). The NMR spectrum 706 was obtained experimentally using a solution of the trifunctional crosslinker 709 in $CDCl_3$. Positions of hydrogen atoms on trifunctional crosslinker 709 and their corresponding spectral peaks in the NMR spectrum 706 are labeled a-e in FIG. 7B.

The sample of trifunctional furan crosslinker 709 from which the NMR 706 was obtained was synthesized as follows:

A mixture of 5 g trimesic acid, 10 mL of $SOCl_2$, and a catalytic amount of DMF was heated to reflux for ~3 hours. Remaining $SOCl_2$ was evaporated under reduced pressure to obtain the trimesoyl chloride product. The trimesoyl chloride and about 10 eq. of furfuryl alcohol were then dissolved in DMF. Pyridine was added dropwise to the solution at 0° C. and stirred for ~18 hours. The reaction mixture was then diluted with excess DCM and extracted with about 1 M HCl. The extracted organic phase was dried with $MgSO_4$ and purified via column chromatography (~1:1 hexanes:ethyl acetate) to obtain the trifunctional furan crosslinker 709.

Figure 8A:
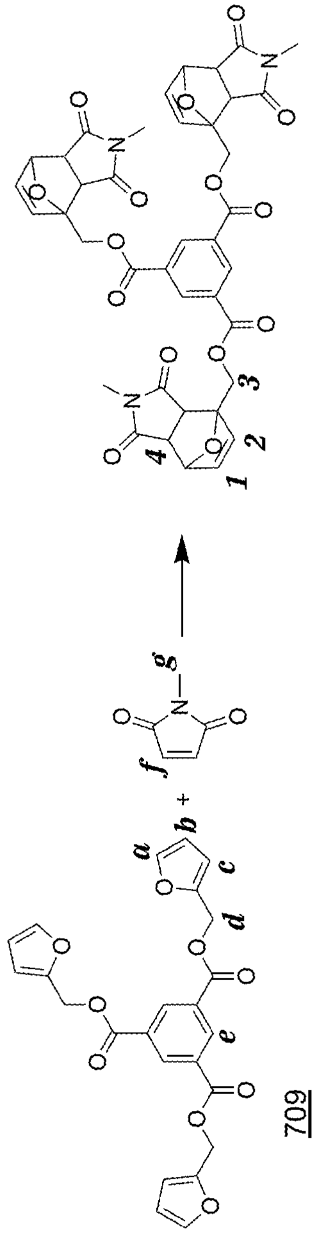
FIG. 8A is a chemical reaction diagram illustrating a Diels-Alder reaction between the second trifunctional furan crosslinker and N-methylmaleimide, according to some embodiments.
Figure 8B:
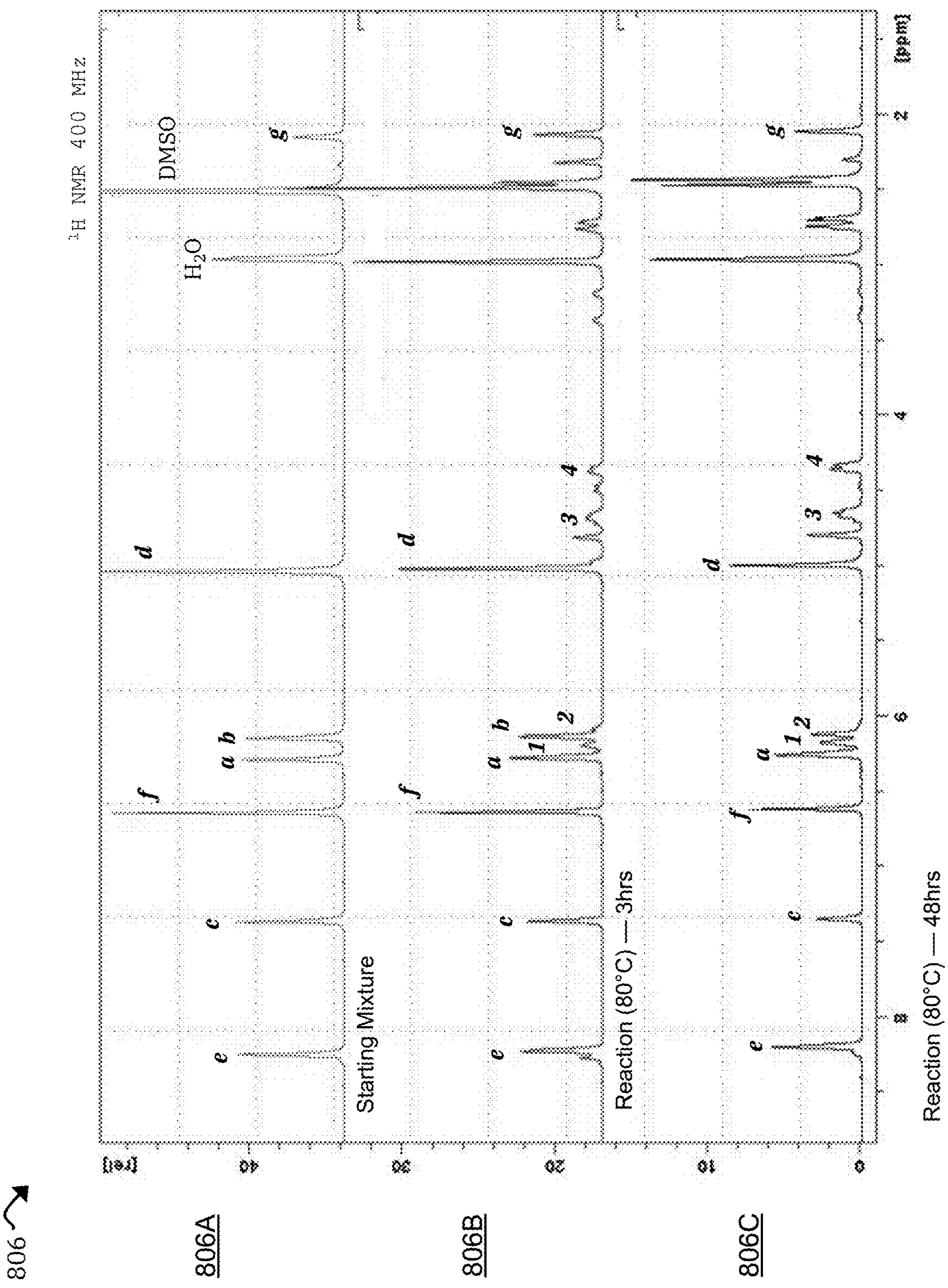
FIG. 8B is a set of $^1$H NMR spectra obtained at three time intervals while monitoring an experimental example of the reaction illustrated in FIG. 8A.

FIG. 8A is a chemical reaction diagram illustrating a Diels-Alder reaction 800 between the second trifunctional furan crosslinker 709 and N-methylmaleimide, according to some embodiments. In other embodiments, reaction 800 may be carried out using the first trifunctional furan crosslinker 703. The reaction 800 forms a product 803 with thermally reversible furan/maleimide cycloadducts. FIG. 8B is a set of $^1$H NMR spectra 806A-806C (collectively, 806) obtained at three time intervals while monitoring an experimental example of the reaction 800 illustrated in FIG. 8A. In FIGS. 8A and 8B, the hydrogen atoms of the starting materials are labeled with letters a-g, and the hydrogen atoms of the product 803 are labeled with numbers 1-4.

The first NMR spectrum 806A was obtained from a starting mixture of the reactants of the Diels-Alder reaction 800 (trifunctional furan crosslinker 709 and N-methylmaleimide) in deuterated dimethylsulfoxide (DMSO). The mixture was heated to about 80° C., and the next NMR spectrum 806B was obtained from the mixture after about 3 hours at this temperature. The third NMR spectrum 806C was obtained from the mixture after about 48 hours at approximately 80° C. As can be seen from the set of NMR spectra 806, the reaction 800 between second trifunctional crosslinker 709 and N-methylmaleimide proceeded slowly, which may be advantageous in forming a crosslinking network (see, e.g., FIG. 9A).

Figure 9A:
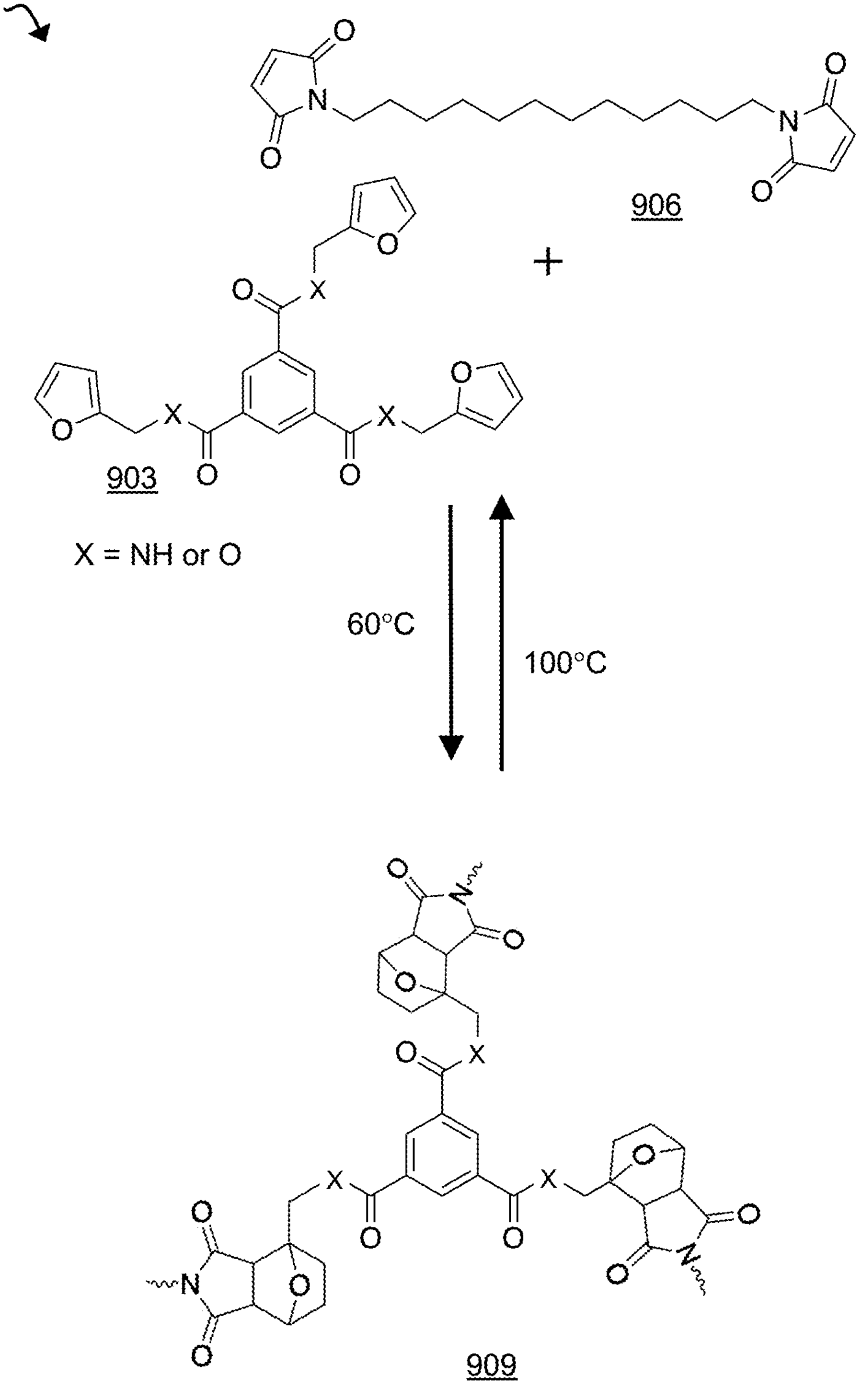
FIG. 9A is a chemical reaction diagram illustrating formation of a thermally reversible crosslinking network, according to some embodiments.

FIG. 9A is a chemical reaction diagram illustrating formation 900 of a thermally reversible crosslinking network, according to some embodiments. A trifunctional furan crosslinker 903 ("trifunctional crosslinker 903") can be blended with a bis-maleimide compound ("bismaleimide") 903. In some embodiments, trifunctional crosslinker 903 represents one or both of the crosslinkers 703/709 illustrated in FIGS. 7A and 7B. In the structure of trifunctional crosslinker 903 shown in FIG. 9A, X can represent O (of ester moiety) or NH (of amide moiety). The mixture of bismaleimide 906 and trifunctional crosslinker 903 may be cured at about 60° C., resulting in a crosslinked network 909 formed by Diels-Alder reactions between the trifunctional crosslinker 903 and multiple equivalents of the bismaleimide 906 (represented by wavy bonds to the imide nitrogen atoms). Only one crosslinking unit in the network 909 is illustrated in FIG. 9A. However, as understood by persons of ordinary skill, the crosslinking network 909 includes multiple units of bismaleimide species 906 linked by the trifunctional crosslinker 903. The wavy bonds to the imide nitrogen atoms represent covalent bonds to carbon atoms, as shown in the structure of the bismaleimide 906. When the temperature of the crosslinking network 909 is raised to (or above) a threshold temperature (e.g., about 100° C.), reverse dimerization of the cycloadduct crosslinks can occur. When the temperature is lowered, the network 909 can re-dimerize.

In some embodiments, a mixture of the bismaleimide 906 and trifunctional furan crosslinker 903 can be blended with a polysiloxane, e.g., at operation 110 of process 100 (FIG. 1A). In some embodiments, the crosslinking agents 903 and 906 are immiscible in the polysiloxane. Curing the mixture can create a polymer network containing the crosslinking network 909, having both physical and covalent crosslinks, and a polysiloxane. This polymer network can be used to provide a reworkable TIM, which may also include a thermally conductive filler. Experimental examples of this process were carried out using PDMS and the crosslinking agents 903 and 906. In these examples, the crosslinking agents 903 and 906 were immiscible in PDMS, causing phase-segregation. Both the physical and covalent crosslinks in the crosslinking network 909/PDMS blend may be disrupted with a thermal stimulus, e.g., at operation 140 of process 101 (FIG. 1B), to allow reworking/healing of the TIM. In some embodiments, reworking may be used to improve distribution of a thermally conductive filler throughout the TIM.

Figure 9B:
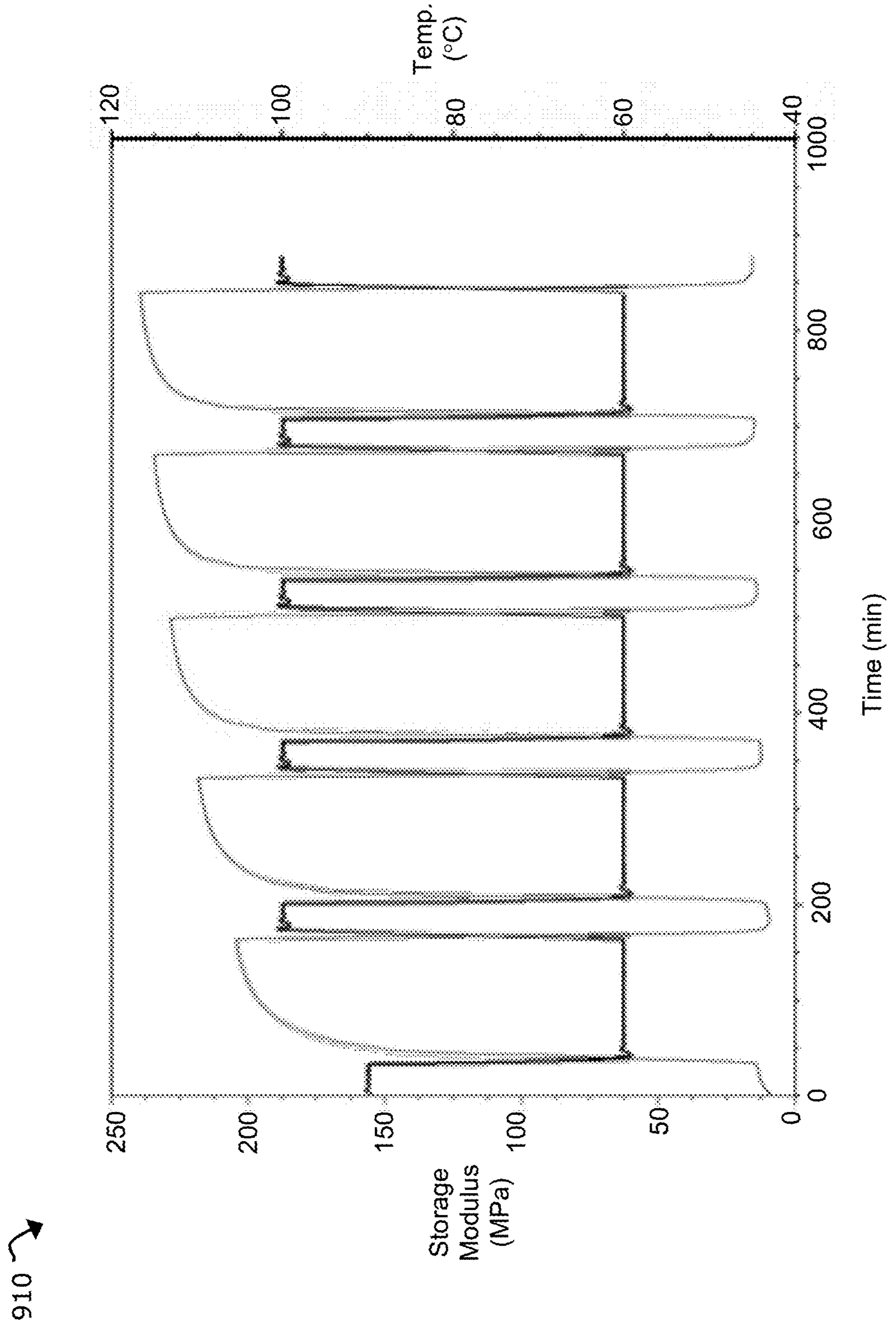
FIG. 9B is a graph showing experimental results obtained by dynamic mechanical analysis (DMA) of a crosslinking network illustrated in FIG. 9A.

FIG. 9B is a graph 910 showing experimental results obtained by dynamic mechanical analysis (DMA) of a crosslinked network 909 (where X═O, as illustrated in FIG. 9A). The DMA results measure changes in the storage modulus of the crosslinking network 909 upon application of a heat stimulus. A film of the crosslinking network 909 (where X═O) was formed by curing a mixture of trifunctional furan crosslinker 903 (709) and the bismaleimide 906 at 60° C. Changes in the storage modulus of the resulting crosslinking network 909 were monitored while cycling between 60° C. to 120° C. (5° C./minute). As shown in the graph 910, the storage modulus of the crosslinked network 909 can be reversibly lowered in response to application of a thermal stimulus.

Figure 10A:
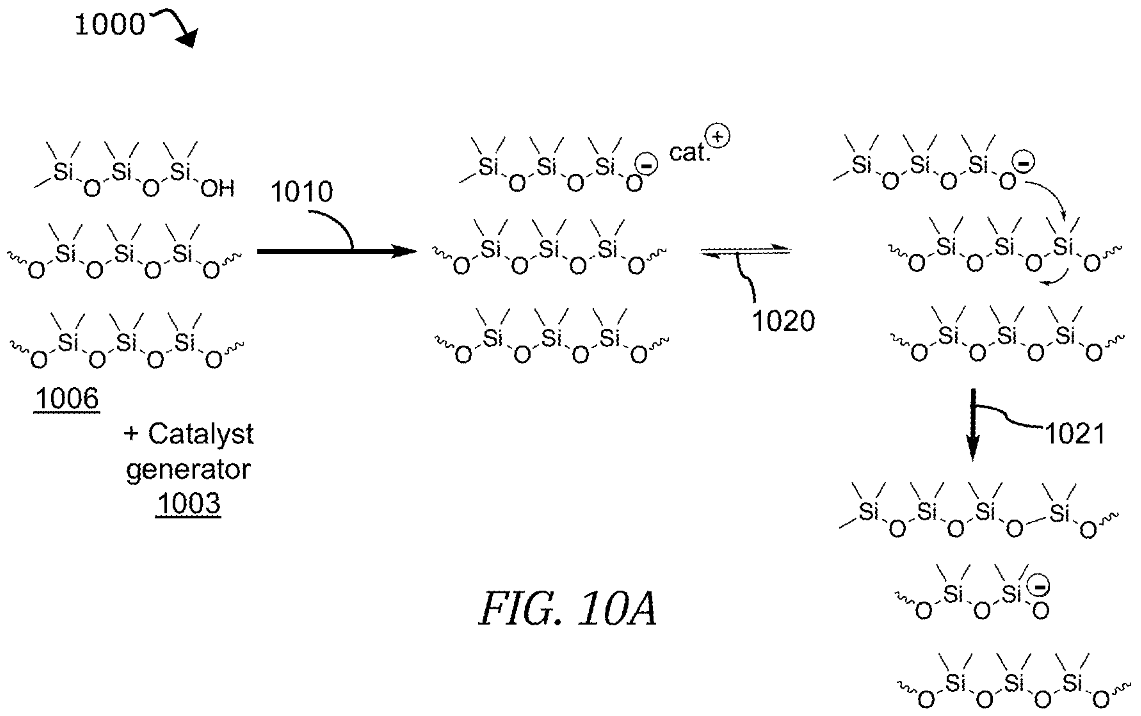
FIG. 10A is a chemical reaction diagram illustrating a process of reworking a TIM by thermal activation of a latent catalyst, according to some embodiments.

FIG. 10A is a chemical reaction diagram illustrating a process 1000 of reworking a TIM by thermal activation of a heat-activated latent catalyst ("organic catalyst generator" or "catalyst generator"), according to some embodiments. The organic catalyst generator 1003 (e.g., ≤1 wt. %) can be blended with hydroxy-terminated PDMS 1006. In some embodiments, the hydroxy-terminated PDMS 1006/catalyst generator 1003 mixture can be combined with a thermally conductive filler to form a polymer composite TIM. For example, the TIM may include a hydroxy-terminated PDMS 1006/catalyst generator 1003 matrix with an alumina-aluminum filler. However, various thermally conductive fillers may be used, such as fillers containing graphite, aluminum, aluminosilicate, aluminum nitride, aluminum oxide, boron nitride (BN), liquid gallium or its alloys, etc. In other embodiments, the hydroxy-terminated PDMS 1006/catalyst generator 1003 mixture may be combined with a conventional TIM, such as Dow Corning® TC-3040 Thermally Conductive Gel (manufactured by Dow, Inc.), thereby allowing the TIM to be reworked. In some embodiments, the catalyst generator 1003 is a salt that forms DBU (1,8-diazabicyclo[5.4.0]undec-7-ene) when heated to a trigger temperature.

Figure 10B:
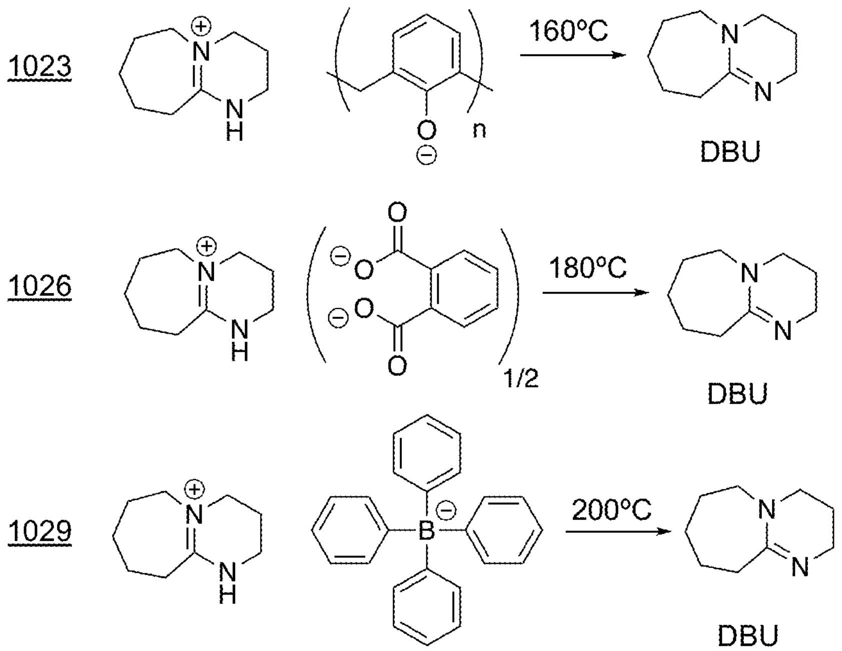
FIG. 10B is a set of chemical reaction diagrams illustrating examples of salts that may be used as catalyst generators, according to some embodiments.

FIG. 10B is a set of chemical reaction diagrams 1023-1029 illustrating examples of DBU-forming salts that may be used as catalyst generators, according to some embodiments. As shown in FIG. 10B, the example catalyst generators 1003 in diagrams 1023-1029 can form DBU at trigger temperatures of about 160° C., 180° C., and 200° C., respectively. In some embodiments, the DBU generator of diagram 1026 is used as the catalyst generator 1003 in process 1000 (FIG. 10A). However, other DBU generators (e.g., those shown in diagrams 1023 and 1029) may be used as well. Other latent catalysts than DBU may be used in some embodiments. For example, compounds that may be used as the catalyst generator 1003 may include salts that generate catalysts such as triazabicyclodecene (1,5,7-triazabicyclo[4.4.0]dec-5-ene, or TBD), pyridine, tetra-n-butylammonium fluoride (TBAF), etc.

Referring again to FIG. 10A, any appropriate curing conditions can be used to cure the TIM containing the hydroxy-terminated PDMS 1006/catalyst generator 1003 mixture at a temperature lower than the trigger temperature for the catalyst generator 1003. This is illustrated at operation 1010. For example, the TIM may be cured at about 120° C.

The cured TIM can be reworked by applying a thermal stimulus to activate the catalyst generator 1003. This is illustrated at operation 1020. For example, if the catalyst generator 1003 is the DBU salt illustrated in diagram 1026 of FIG. 10B, the thermal stimulus may have a threshold temperature of at least 180° C. In response to the thermal stimulus, the activated catalyst ("cat." in FIG. 10A) can form anionic ends on the hydroxy-terminated PDMS 1006 and cleave silicon-oxygen bonds. This reaction can be continued until the equilibrium reaction is stopped (at operation 1021).

The descriptions of the various embodiments of the present disclosure have been presented for purposes of illustration, but are not intended to be exhaustive or limited to the embodiments described. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A thermal interface material (TIM), comprising:

a hydroxy-terminated polysiloxane blended with a catalyst generator, wherein the catalyst generator has an activation higher than a curing temperature of the hydroxy-terminated polysiloxane and, when activated by a thermal stimulus, catalyzes cleavage of silicon-oxygen bonds in the hydroxy-terminated polysiloxane, wherein the thermal stimulus has a temperature in a range from 160° C. to 200° C.

2. The TIM of claim 1, wherein the hydroxy-terminated polysiloxane is hydroxy-terminated polydimethylsiloxane.

3. The TIM of claim 1, wherein the catalyst generator is a salt that forms 1,8-diazabicyclo[5.4.0]undec-7-ene (DBU) in response to the thermal stimulus.

4. The TIM of claim 3, wherein the catalyst generator is a salt that forms a catalyst selected from the group consisting of triazabicyclodecene, pyridine, and tetra-n-butylammonium fluoride.

5. The TIM of claim 1, wherein the catalyst generator comprises up to 1% by weight of the hydroxy-terminated polysiloxane blend.

6. The TIM of claim 1, wherein the TIM further comprises a thermally conductive filler.

7. A method of providing a thermal interface material (TIM), comprising:

blending a hydroxy-terminated polysiloxane with a catalyst generator, wherein the catalyst generator has an activation higher than a curing temperature of the hydroxy-terminated polysiloxane and, when activated by a thermal stimulus, catalyzes cleavage of silicon-oxygen bonds in the hydroxy-terminated polysiloxane, wherein the thermal stimulus has a temperature in a range from 160° C. to 200° C.

8. The method of claim 7, further comprising:

applying the TIM at an interface between a heat source and a heat sink; and curing the TIM at a temperature below the activation temperature of the catalyst generator.

9. The method of claim 8, further comprising, after the curing, applying the thermal stimulus above the activation temperature.

10. The method of claim 7, wherein the hydroxy-terminated polysiloxane is hydroxy-terminated polydimethylsiloxane.

11. The method of claim 7, wherein the catalyst generator is a salt that forms 1,8-diazabicyclo[5.4.0]undec-7-ene (DBU) in response to the thermal stimulus.

12. The method of claim 7, wherein the catalyst generator is a salt that forms a catalyst selected from the group consisting of triazabicyclodecene, pyridine, and tetra-n-butylammonium fluoride.

13. A method of forming a semiconductor package, comprising:

providing a thermal interface material (TIM) comprising a hydroxy-terminated polysiloxane blended with a catalyst generator, wherein the catalyst generator has an activation higher than a curing temperature of the hydroxy-terminated polysiloxane and, when activated by a thermal stimulus, catalyzes cleavage of silicon-oxygen bonds in the hydroxy-terminated polysiloxane, wherein the catalyst generator, response to the thermal stimulus, wherein the thermal stimulus has a temperature in a range from 160° C. to 200° C.

14. The method of claim 13, further comprising:

applying the TIM at an interface between a heat source and a heat sink of the semiconductor package; and curing the TIM at a temperature below the activation temperature of the catalyst generator.

15. The method of claim 13, wherein the catalyst generator, in response to the thermal stimulus, forms a catalyst selected from the group consisting of 1,8-diazabicyclo[5.4.0]undec-7-ene, triazabicyclodecene, pyridine, and tetra-n-butylammonium fluoride.

16. A semiconductor package, comprising:

a thermal interface material (TIM), wherein the TIM comprises:

a hydroxy-terminated polysiloxane blended with a catalyst generator, wherein the catalyst generator has an activation higher than a curing temperature of the hydroxy-terminated polysiloxane and, when activated by a thermal stimulus, catalyzes cleavage of silicon-oxygen bonds in the hydroxy-terminated polysiloxane, wherein thermal stimulus has a temperature in a range from 160° C. to 200° C.

17. The semiconductor package of claim 16, wherein the TIM further comprises a thermally conductive filler.

18. The semiconductor package of claim 16, wherein the catalyst generator is a salt that forms 1,8-diazabicyclo[5.4.0]undec-7-ene (DBU) in response to the thermal stimulus.

19. The semiconductor package of claim 16 wherein the catalyst generator is a salt that forms a catalyst selected from the group consisting of triazabicyclodecene, pyridine, and tetra-n-butylammonium fluoride.

20. A computing device, comprising:

at least one semiconductor package containing a thermal interface material (TIM), wherein the TIM comprises: a hydroxy-terminated polysiloxane blended with a catalyst generator, wherein the catalyst generator has an activation higher than a curing temperature of the hydroxy-terminated polysiloxane and, when activated by a thermal stimulus, catalyzes cleavage of silicon-oxygen bonds in the hydroxy-terminated polysiloxane, wherein the thermal stimulus has a temperature in a range from 160° C. to 200° C.

21. The computing device of claim 20, wherein the hydroxy-terminated polysiloxane is hydroxy-terminated polydimethylsiloxane.

22. The computing device of claim 20, wherein the catalyst generator is a salt that forms 1,8-diazabicyclo[5.4.0]undec-7-ene (DBU) in response to the thermal stimulus.

* * * * *